United States Patent
Stefano

[11] 3,806,233
[45] Apr. 23, 1974

[54] MULTIFACE AUTOMOBILE REAR-VIEW MIRROR SYSTEM

[75] Inventor: Nicholas M. Stefano, Rolling Hills Estates, Calif.

[73] Assignee: TRW Inc., Redondo Beach, Calif.

[22] Filed: Dec. 14, 1972

[21] Appl. No.: 315,146

Related U.S. Application Data

[63] Continuation-in-part of Ser. No. 211,515, Dec. 23, 1971, abandoned.

[52] U.S. Cl. .................. 350/307, 350/299, 350/303, 350/293
[51] Int. Cl. ............................................. G02b 5/08
[58] Field of Search .......... 350/288, 299, 303, 307, 350/286, 276, 277, 165, 168, 295, 283, 304, 282, 293, 294

[56] References Cited
UNITED STATES PATENTS

| | | | |
|---|---|---|---|
| 3,177,759 | 4/1965 | Wilks | 350/286 X |
| 2,763,187 | 9/1956 | Wiener | 350/303 |
| 2,953,062 | 9/1960 | Ford | 350/286 |
| 2,746,354 | 5/1956 | Barkley | 350/282 |
| 2,525,012 | 10/1950 | Armstrong | 350/283 |
| 3,333,432 | 1/1971 | Livingston | 351/165 UX |
| 2,835,819 | 10/1958 | Luboshez | 350/286 X |
| 2,722,159 | 11/1955 | Budreck | 350/280 |
| 2,709,945 | 6/1955 | Kuhn | 350/283 |

FOREIGN PATENTS OR APPLICATIONS

| | | | |
|---|---|---|---|
| 708,315 | 5/1954 | Great Britain | 350/288 |
| 894,631 | 4/1962 | Great Britain | 350/303 |

Primary Examiner—Ronald L. Wibert
Assistant Examiner—Michael J. Tokar
Attorney, Agent, or Firm—Daniel T. Anderson, Esq.; Edwin A. Oser, Esq.; Jerry A. Dinardo

[57] ABSTRACT

A multifacet rear-view mirror system for automotive vehicles which affords a substantially distortion free, wide rear view which may encompass an angle in excess of 90°. The mirror system comprises a plurality of facets approximately parallel to each other, each being tilted with respect to a vertical plane passing through the mirror system. The elongated strip of mirror facets is twisted about a horizontal axis passing through the entire length of the mirror system. This will avoid the necessity for mounting the mirror with one side lower than the other, which would otherwise be required to afford a substantially horizontal field of view to the rear. The mirror system does not present a safety hazard and may be made of a plastic material which will yield on impact.

25 Claims, 18 Drawing Figures

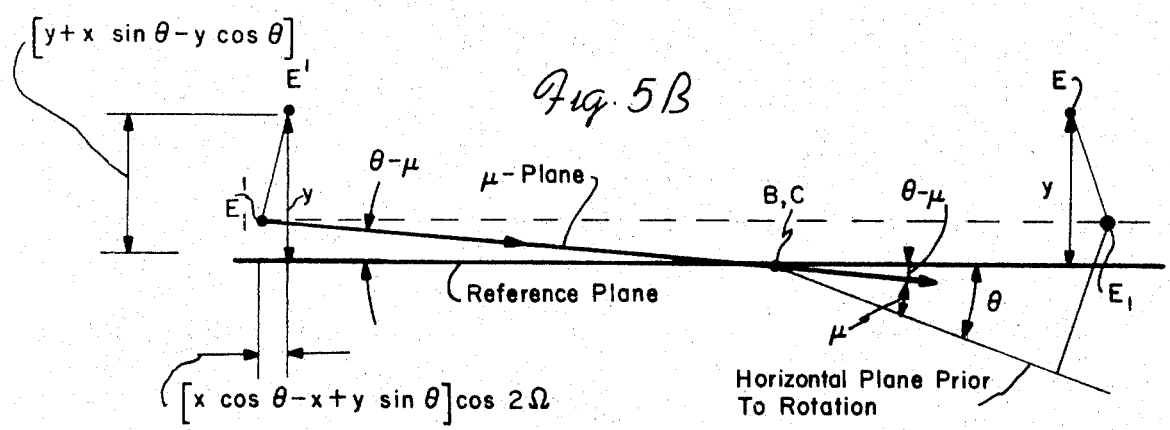
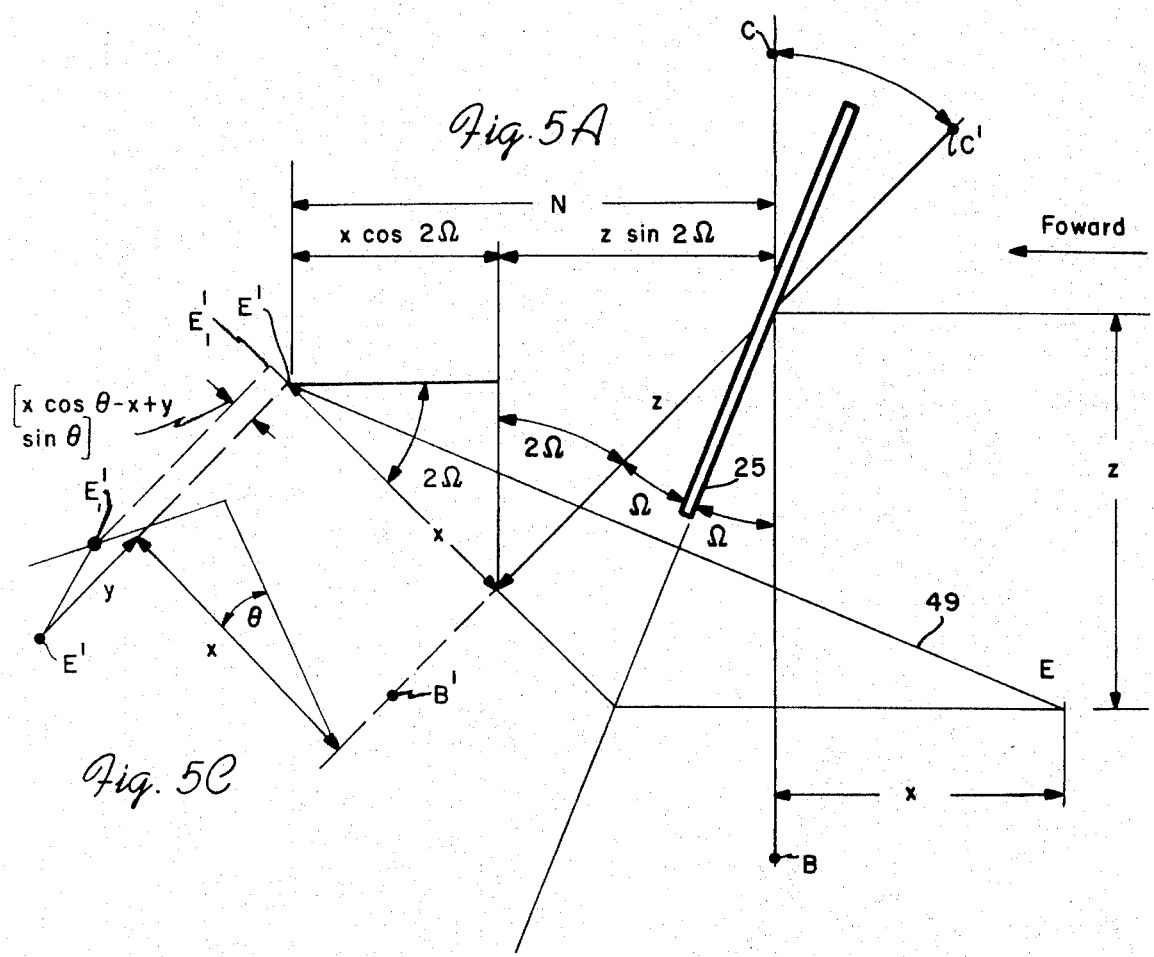

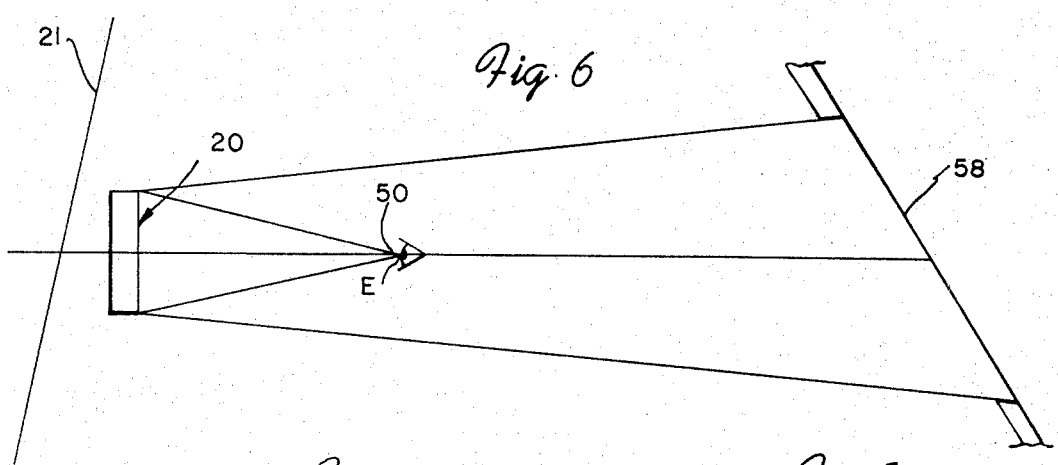
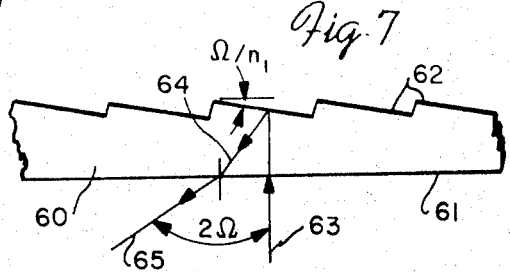
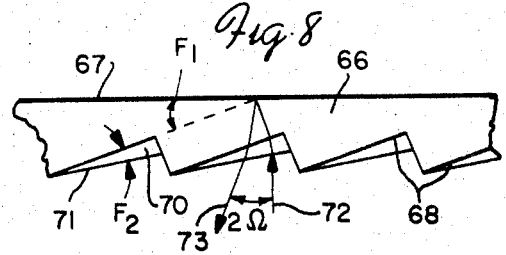
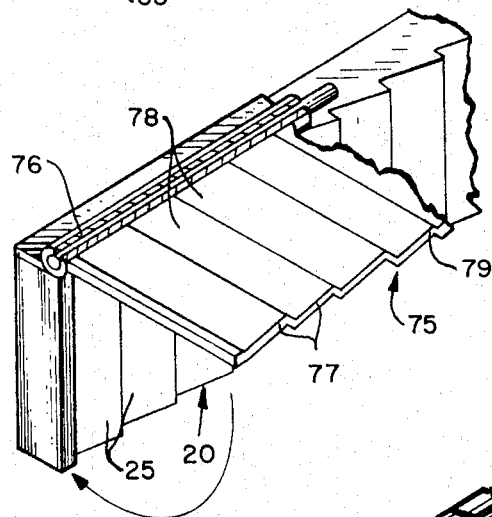
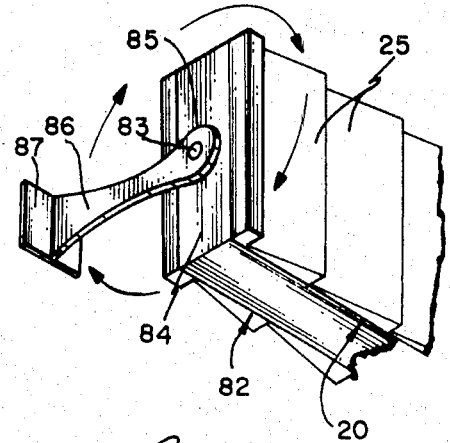
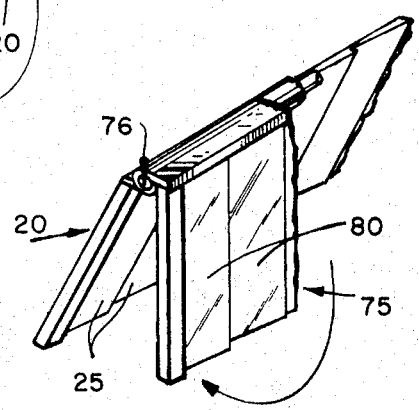

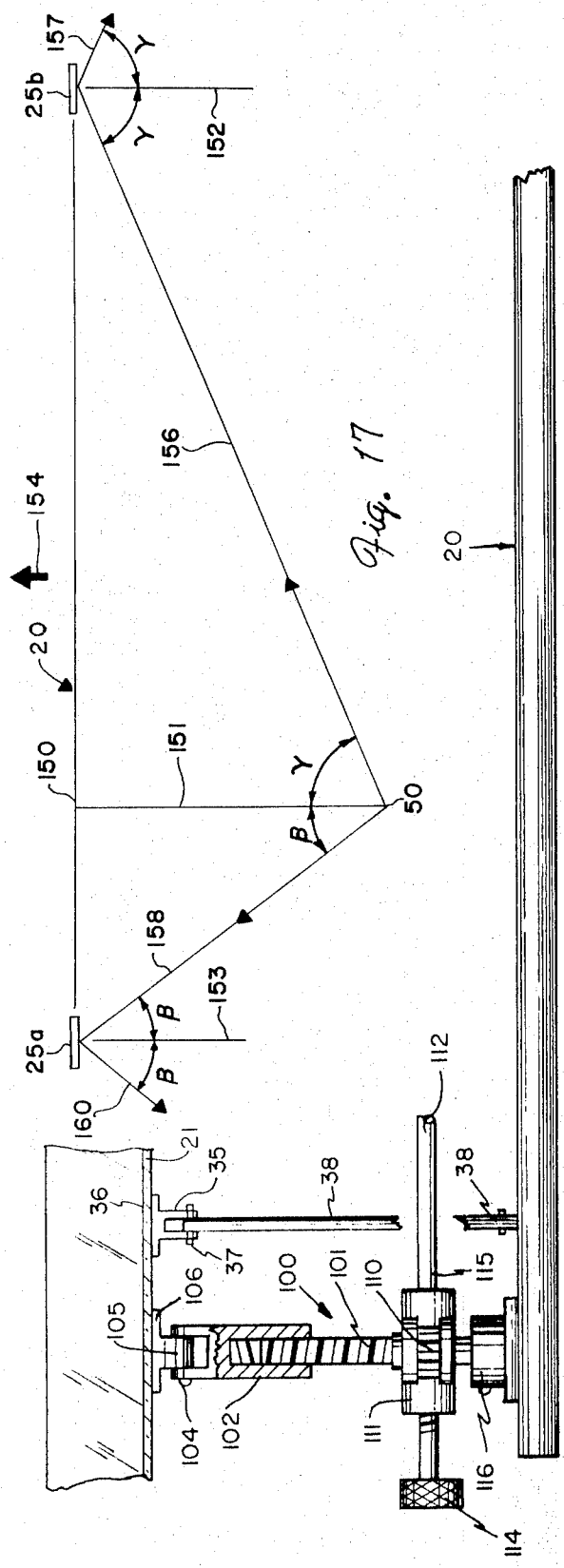

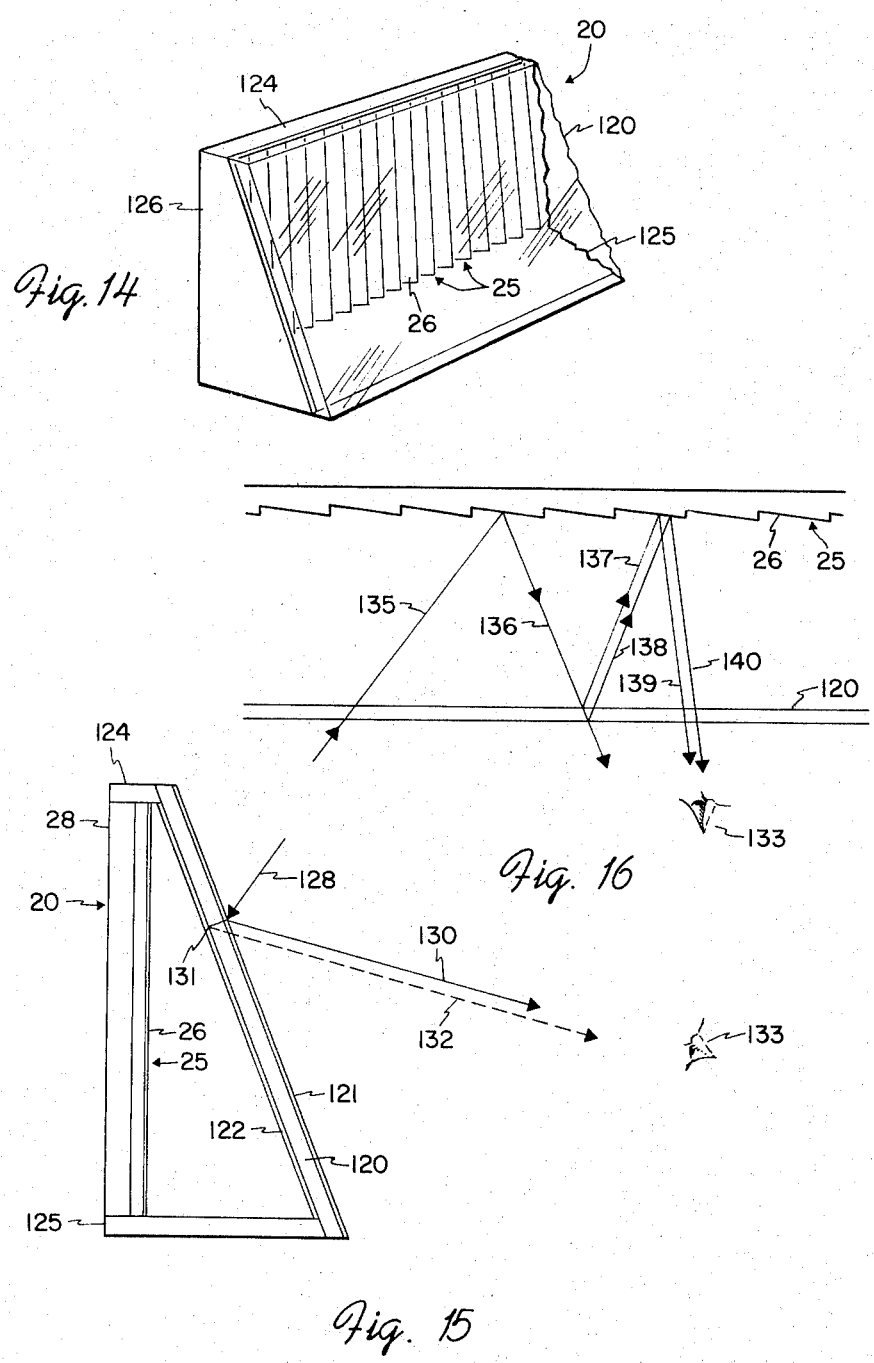

MULTIFACE AUTOMOBILE REAR-VIEW MIRROR SYSTEM

CROSS REFERENCE TO RELATED APPLICATION

This application is a Continuation-In-Part of my prior copending application Ser. No. 211,515 filed on Dec. 23, 1971, now abandoned.

BACKGROUND OF THE INVENTION

This invention relates generally to rear-view mirror systems for automotive vehicles and particularly relates to such a mirror which affords a substantially distortionless rear view of approaching vehicles over a wide angle which may exceed 90°.

Present day automobiles are conventionally provided with a rear-view mirror and one or more side-view mirrors. In spite of this array of mirrors it is well known that it is almost impossible for a driver to have a sufficiently wide-angle rear view so that he can see vehicles approaching not only from the rear but from adjacent lanes into which the driver may wish to turn. To minimize this safety hazard it has been proposed to provide one or more wide-angle convex mirrors such as a side-view mirror. However, such convex mirrors have the disadvantage that they distort not only the size of approaching vehicles, but also their relative speed. Therefore, it is difficult for a driver to judge where an approaching vehicle may be some time later and whether it is safe, for example, to change lanes.

Recently proposed federal safety standards call for a rear-view mirror having a 90° rear-view angle. This is difficult, if not impossible, to achieve with presently known mirrors.

In the past wide-angle, rear-view mirrors have been proposed, for example, in the patent to Schroeder, U.S. Pat. No. 2,573,812. This patent proposes a system of parallel, tilted mirrors disposed in an elongated casing. However, one of the disadvantages of this structure is the relative thickness of the casing which presents a safety hazard. It is also proposed in this patent to coat the front surfaces of the mirror elements with a protective coating to provide a front-surface mirror system. However, the main drawback of the rear-view mirror system of Schroeder is that it is necessary to lower the left-hand portion of the casing with respect to the right-hand portion if a substantially horizontal field of view is to be seen by the vehicle operator. This in turn will at least partially obscure the vision of the driver.

A somewhat similar optical rear-view system has been disclosed in the patent to Ford, U.S. Pat. No. 2,953,062. Again the individual mirrors are disposed parallel to each other and tilted with respect to a vertical plane. The arrangement is such as to reduce the thickness of the mirrors. However, this mirror structure again has the drawback, should it be elongated to provide a large rear view angle, with a horizontal field, that it must be disposed at an angle to a horizontal axis. A similar array of parallel mirror elements mounted in the frame has been proposed in the patent to Smith, U.S. Pat. No. 3,510,206.

A somewhat different rear-view structure has been disclosed in the patent to Wiener, U.S. Pat. No. 2,763,187. In this case, however, the front coated mirrors are not arranged parallel to each other. Therefore, the mirrors do not preserve the continuity of the field of view and are not intended to do so.

The British Pat. No. 894,631 to Jacobs discloses a vehicle driving mirror. In this patent it is suggested to mount the support of the mirror adjustably to permit simultaneous tilting of all elemental mirrors. It has further been suggested that the elemental mirrors may be separately tiltable though no structure has been shown to accomplish this end. Such a construction does not permit an uninterrupted, wide-angle rear view because if individual mirror facets are tilted with respect to each other the fields of view are vertically displaced at adjacent edges of the facets.

To emphasize again, all of these prior art mirror structures require that the elongated mirror system be lowered at the left-hand portion with respect to the right-hand portion if it is desired to have a complete and uninterrupted wide-angle horizontal field of view.

Accordingly it is an object of the present invention to provide a rear-view mirror system for an automotive vehicle which affords a substantially horizontal wide-angle rear view without distortion of the size or relative speed of approaching vehicles.

A further object of the present invention is to provide a rear-view mirror system of the type discussed which does not have to be mounted at an angle to a horizontal axis and still provides a substantially horizontal rear view field.

A further object of the present invention is to provide such a rear-view mirror system which is relatively thin along the direction of motion of the vehicle and does not interfere with the conventional sun visor.

Still a further object of the present invention is to provide a wide-angle, rear-view mirror system which does not present a safety hazard, which may be molded of a plastic material, which will yield on impact.

Still another object of the present invention is to provide a rear-view mirror system of the type discussed which is operative both as a day and night rear-view mirror.

SUMMARY OF THE INVENTION

A wide-angle, rear-view mirror system for an automotive vehicle in accordance with the present invention comprises a multiplicity of individual mirror facets. The mirror facets may be mounted adjacent to each other on an elongated support structure. The support structure is adapted to be disposed substantially across the entire length of the top of the windshield of the vehicle.

The mirror facets are tilted with respect to a vertical plane passing through the support structure. Additionally, the facets are disposed approximately parallel to each other. Finally in accordance with the present invention the mirror facets are twisted about a horizontal axis passing through the support structure. This will afford a substantially horizontal rear view field which may extend over 90° without distorting the size or relative speed of other vehicles approaching from the rear or side.

The novel features that are considered characteristic of this invention are set forth with particularity in the appended claims. The invention itself, however, both as to its organization and method of operation, as well as additional objects and advantages thereof, will best be

BRIEF DESCRIPTION OF THE DRAWINGS

FIG. 5A is another sketch of a top plan view with an appended side view of one mirror facet which will be helpful in explaining and calculating the angle of twist in the mirror system;

FIG. 5B is a side view of the mirror facet of FIG. 5A and related geometrical relationships;

FIG. 5C is a projection taken from FIG. 5A as shown by the dashed lines;

FIG. 6 is a schematic elevational view of the mirror system of the invention in an automobile showing the observer's eye disposed at the center of the mirror vertical dimension;

FIG. 7 is a sectional view of a modified mirror system embodying the present invention;

FIG. 8 is a sectional view of another embodiment of the present invention which provides correction for chromatic aberration;

FIG. 9 is a view in perspective of a mirror system in accordance with the present invention including a night vision mirror which may be tilted over the day vision mirror;

FIG. 10 is a view in perspective of another embodiment of a day and night vision mirror system including a day mirror portion which may be tilted up and rearwardly for nighttime use;

FIG. 11 is a view in perspective of a rotatable double mirror system, one side suitable for day use and the other for night vision;

FIG. 12 is a top plan view of a modified mirror system and an automobile windshield in accordance with the present invention and which provides for an adjustment of the angle of twist;

FIG. 13 is a side elevational view of a portion of the mirror system of FIG. 12;

FIG. 14 is a view in perspective of a modified mirror system in accordance with the present invention providing a protective cover;

FIG. 15 is a cross sectional view of the mirror system of FIG. 14 indicating reflected rays which may cause ghost images;

FIG. 16 is a sectional view of the mirror system of FIG. 14 taken horizontally through the view of FIG. 15; and FIG. 17 is a sketch illustrating geometrical relations between the driver's eye and the mirror system and which defines several angles.

DESCRIPTION OF THE PREFERRED EMBODIMENTS

Figure 1:
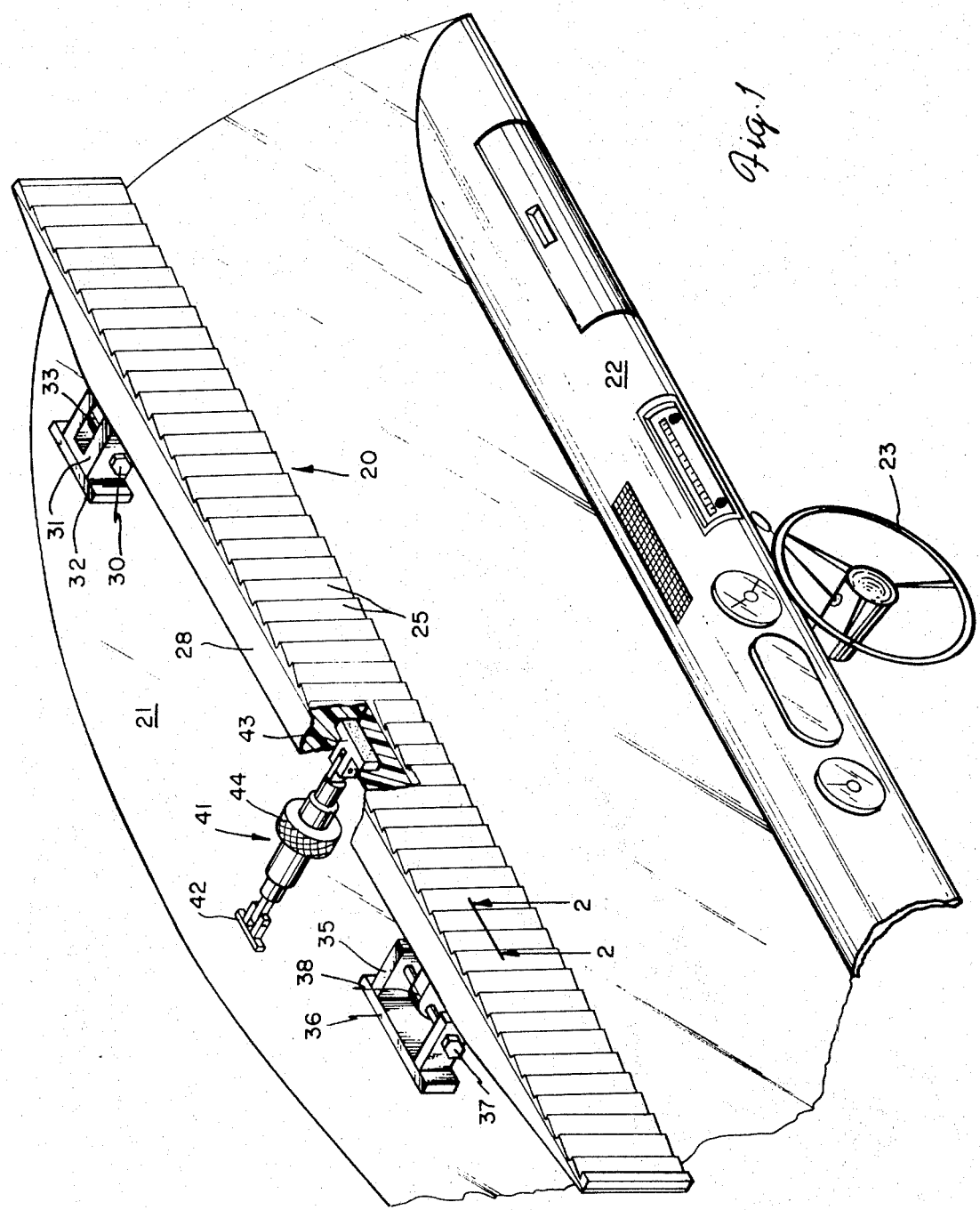
FIG. 1 is a view in perspective of the rear-view mirror system of the invention with its mounting structure shown in connection with the windshield and dashboard of an automotive vehicle.

Referring now to the drawings and particularly to FIG. 1, there is illustrated a mirror system 20 in accordance with the present invention disposed in an automotive vehicle. As shown in FIG. 1, the mirror system 20 is secured by cementing or gluing it to the windshield 21 of an automobile having a dashboard 22 and a steering wheel 23. The mirror system 20 consists essentially of a plurality of adjacent and approximately parallel mirror facets 25 as shown particularly in FIG. 2. As will be explained hereinafter the mirror facets 25 are approximated but not exactly parallel to each other. Further, they are disposed at an angle to a vertical plane passing through the mirror system 20.

The mirror system 20 may be made of glass. Preferably, however, the facets 25 are made of a suitable plastic such, for example, as polystyrene or polymethyl methacrylate. A mirror system consisting of a plastic material does not present the safety hazard of a glass system which is apt to splinter on impact to produce sharp or jagged edges.

Preferably the facets 25 are provided with a reflective coating at their surface 26 (FIG. 2) facing the driver, that is they are front surface mirrors. The reflective coating of the surface 26 may, for example, consist of a layer of aluminum. To this end the mirror structure 20 may be disposed in a vacuum system which may be evacuated to a high vacuum. Thereafter, aluminum, for example, from an aluminum wire or an aluminum coated wire, may be sputtered onto the mirror structure. Furthermore, the reflecting surface 26 may be protected from the corrosive or oxidizing effects of the atmosphere by a suitable transparent dielectric layer which may be applied in any conventional manner.

Figure 2:
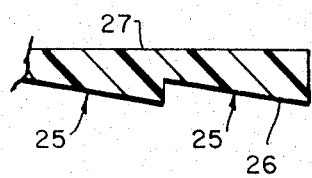
FIG. 2 is an enlarged longitudinal sectional view of two adjacent facets of the mirror system, taken on line 2—2 of FIG. 1.

The individual mirror facets 25 are provided with a planar rear surface 27 as shown in FIG. 2 which may be cemented or otherwise secured to a support structure 28 which will support the mirror system 20 in the desired configuration as will be more fully explained hereinafter. The support structure 28 may also consist of a suitable plastic material. For example, it may consist of a foam plastic such as a high impact polystyrene.

The mirror structure 20 is now secured to the windshield 21 in accordance with present safety standards. The safety consideration is that, upon impact, the windshield 21 is designed to fracture into small fragments whereupon the mirror structure 20 will simply fall away without the possibility of creating a rigid, sharp portion. To this end the right-hand portion of the mirror structure 20 is rotatably mounted on an axis defined by a bolt 30 which passes through a U-shaped structure 31 having a flat rear plate 32 which in turn is secured to the windshield. The movable part of the support structure includes a tongue 33 having an opening 34 through which the bolt 30 may pass (see FIG. 3). Preferably there is substantially no play between the U-shaped structure 31 and the tongue 33. The left-hand support of the mirror structure 20 is constructed in a similar manner and also includes a U-shaped structure 35 having a rear plate 36 secured to the windshield 21. A bolt 37 passes through the U-shaped portion 35 to provide a second pivot for the mirror structure. The rotatable portion of the support structure is formed by the tongue 38 which also has an opening 40 for the passage of the bolt.

Accordingly, it will be evident that the mirror structure is capable of rotating about an axis defined by the bolts 30 and 37. Furthermore, since the tongue 33 is tightly held by the U-shaped structure 31, any expansion or contraction of the mirror structure 20 is taken up by the play between the tongue 38 and the two prongs of the U-shaped support 35.

The mirror system 20 must be capable of adjustment to compensate for different heights of a driver and for a more forward or rearward position of the driver. This adjustment is effected by the adjustment element 41, preferably constructed of plastic components, which operates in the nature of a linear actuator. It has a rear plate 42 secured to the windshield 21 and a front plate 43 secured to or molded into the support structure 28. A circular member or disk 44 may be rotated to extend or contract the length of the adjustment element 41 between the plates 42 and 43. Thus, there may be provided two fixed screws and a rotatable nut to change the length of one portion with respect to the other as in a turnbuckle. It will be understood that the plate 43 is disposed in a horizontal plane below that defined by the axis of rotation of the mirror system 20 so that extension or contraction of the adjustment member 41 will rotate the mirror system about its pivot axis.

In accordance with the present invention the mirror system 20 is provided with a longitudinal twist which extends in a counter clockwise direction viewed from either end (for a vehicle driven from the left side). This has been illustrated in FIG. 3 to which reference is now made. As shown, the mirror facet 25a, which is the extreme left-hand facet, is shown in a side view, and is twisted in a counter clockwise direction with respect to facet 25b, the extreme right-hand facet of the facets 25. The angle of twist has been indicated in FIG. 3 by $\Delta\theta$. This will be more fully explained hereinafter in connection with FIGS. 4, 5A and 5B to which reference will now be made.

Figure 4:
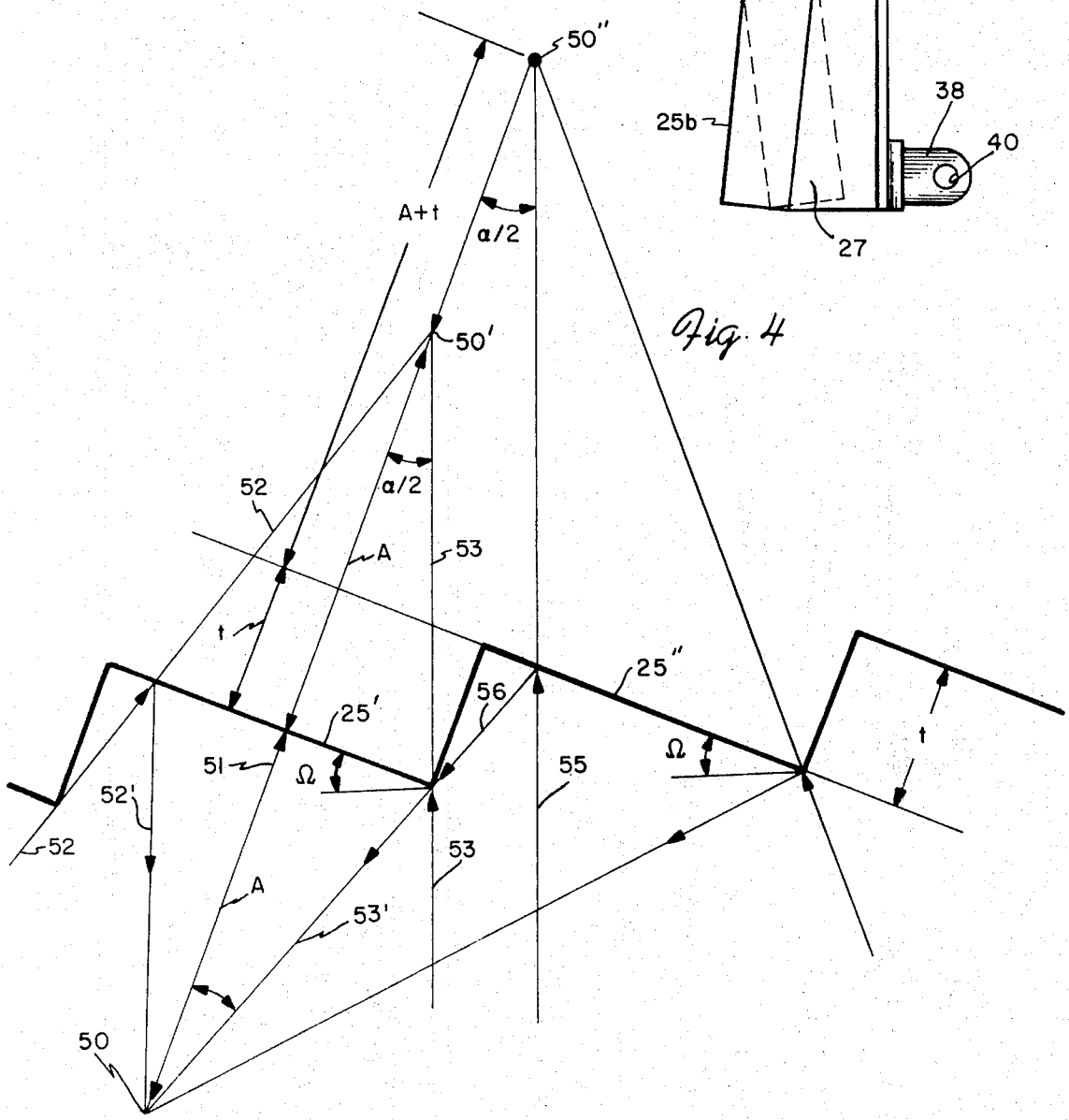
FIG. 4 is a sketch illustrating geometrical relations between two adjacent mirror facets and an eye of the observer to explain the parallel distribution of the mirror facets and the continuity of the field of view.

Referring now to FIG. 4, there is illustrated a pair of adjacent mirror facets 25' and 25''. FIG. 4 serves the purpose to explain the reason why the mirror facets such as 25' and 25'' are arranged approximately parallel to each other. The location of the driver's eye is shown at 50. FIG. 4 is, of course, a top plan view and it is assumed that the observer's eye 50 is in the paper plane. The field of view of the eye 50 in the mirror 25' is determined by locating the image of the eye in the mirror, that is the reflected eye which appears at 50'. The point 50' is disposed along the normal 51 to the mirror 25' at a distance A which is the distance between the point 50 and the mirror 25'. Through the point 51 the incident rays 52 and 53 may be drawn to show the limits of unobstructed vision as defined by the mirror 25'.

The image of the eye in mirror 25'' is shown at 50''. This point 50'' is again located on the same normal common to all of the mirror facets. The distance from the mirror 25'' is equal to the distance A + t, where t (as shown) is the thickness of each facet, that is the step between adjacent facets. It should be noted here that rays directed toward the virtual eye image such as 50' and 50'' will enter the eye 50 as shown It will now be shown that there is no discontinuity in the field of view where adjacent mirror facets such as 25' and 25'' join. In order to show this, rays from a distant point, that is, a point far away compared to the distance t will enter the eye 50 from the same direction. This condition means that the rays are substantially parallel. Accordingly, consider now the two rays 53 and 55 which enter the field of view from the rear and which are assumed to be parallel to each other. Each makes an angle $\alpha/2$ with the normal 51. Since the two mirrors 25' and 25'' are parallel the two exiting rays 53 and 56 are parallel. It now remains to be shown that rays 53 and 56 are coincident, providing a continuous field of view. The entering ray 54 and the reflected ray 53 together with the normal 51 between the points 50 and 50' defines an isosceles triangle. This triangle has a base length of 2A and two corner angles of $\alpha/2$. Similarly, the entering ray 55 and the reflected ray 56 defines an isosceles triangle having a base length of 2(A+t) and the same corner angles. Since the entering ray 55 is directed toward 50'' it must be reflected to enter the eye along the line 56, 53'. On the other hand the entering ray 54 is directed toward the point 50'. It must also be reflected to enter the eye along ray 53. Accordingly, it will now be clear that parallel rays from a given distant point behind the observer and which are directed toward the separate virtual eye locations of contiguous mirrors will be directed toward the eye along the same path. This in turn means that the field of view is contiguous in spite of the fact that there are individual facets 25' and 25'' which are separated from each other and which form an angle $\Omega$ with the horizontal line as shown.

If the paper plane of FIG. 4 also passes through the center of the vertical dimension of the mirror facets 25 and through the middle of the vertical opening defined by the car's rear-view window, then a mirror assembly consisting of a multiplicity of facets as shown in FIG. 4 provides a rearward field of view which is satisfactory. This concept is shown in FIG. 6.

The mirror assembly 20 would be located as illustrated in FIG. 6 with respect to the windshield 21 and the rear window 58 as shown in FIG. 6 so that the observer's eye 50 or E is in the plane passing through the center of the mirror assembly. However, the mirror location shown in FIG. 6 is not satisfactory since the mirror assembly 20 would interfere with the driver's vision, as well as being a safety hazard. Accordingly, the mirror assembly must be located at the upper edge of the windshield 21.

This is the main reason why the mirror system of the present invention requires a twist along its horizontal axis. The actual angle of the twist also depends on the angle $\Omega$ and further on the fact that the driver is usually located in the left-hand side of the car. This will be assumed for the following discussion. In some countries like Great Britain the driver is usually located at the right-hand side of the car and in that case the following discussion applies except that left and right must be interchanged.

The angle $\Omega$ is determined or defined if it is desired that the left-hand view and the right-hand view should be equal. With this assumption the angle $\Omega$ is determined by the following formula:

$$\Omega = (\gamma - \beta)/4 \qquad (1)$$

where $\gamma$ is the angle between a normal to a horizontal axis through the mirror system 20 from the observer's eye 50 and a ray to the most right-hand mirror facet. The angle $\beta$ similarly is the angle from the same normal to the left-most mirrot facet. This has been illustrated in FIG. 17 to which reference is now made. In FIG. 17 the twist angle $\Delta\theta$ has been assumed to be 0 so that all facets have surfaces parallel to each other. The mirror system 20 has a horizontal axis 150, to the left of which is shown the left-most mirror facet 25$a$ and to the right there is depicted the right-most mirror facet 25$b$. A normal 151 to the axis 150 passes through the observer's eye 50. Furthermore, a normal 152 passes through mirror facet 25$b$ while the normal 153 passes through the left-hand facet 25$a$. The arrow 154 indicates the forward direction.

Accordingly, the angle $\gamma$ is the angle between the normal 152 and a line 156 from the facet 25$b$ to the observer's eye 50. The angle $\gamma$ is again formed by the normal 152 and a line 157 to the mirror facet 25$b$. The lines 156 and 157 may represent a light ray reflected by the facet 25$b$. Similarly, the angle $\beta$ is defined as the angle between the normal 153 and a line 158 interconnecting facet 25$a$ to the observer's eye 50. The angle $\beta$ is again formed by the normal 153 and a line 160 which may represent a ray reflected by the facet 25$a$ originating in the eye 50 along the line 158 to the line 160. It will be evident that as long as the driver does not sit in the exact middle of the car the angles $\beta$ and $\gamma$ must be different. Of course if they were equal, $\Omega = 0$. The angle of the twist of the mirror system 20 may be determined by means of a geometrical construction as shown in FIGS. 5A and 5B. FIG. 5A is a top plan view of a mirror facet 25 while FIG. 5B is a side view of the same mirror facet, the side view being taken along the axis BC.

The above formula may be derived as follows. It will first be assumed that the mirror 20 is continuous and unfaceted or that all facets have reflecting surfaces parallel to each other as depicted in FIG. 17. If the facet 25$b$ is rotated about a substantially vertical axis through an angle $\Omega$ as shown in FIG. 4 then the reflected ray is rotated through an angle of 2 $\Omega$. The angle between the reflected ray 156 (see FIG. 17) and the normal 152 to facet 25$b$ becomes $\gamma - 2\Omega$. Similarly, if the left-most facet 25$a$ is rotated through an angle $\Omega$, a ray 158 from the eye 50 to the facet 25a rotates from an angle $\beta$ to the normal 153 to an angle $\beta + 2\Omega$ to the normal 153. If now the right-most and left-most reflected ray angles are made equal, then:

$$\gamma - 2\Omega = \beta + 2\Omega$$

from which follows Formula (1).

Referring now to FIGS. 5A and 5B there is shown one of the mirror facets 25 disposed at an angle $\Omega$ with respect to a horizontal axis BC or a vertical plane which extends from left to right across the vehicle. The position of the driver's eye E is defined by the dimensions $x$, $y$ and $z$ as shown in one of the drawing. The mirror facets 25 is shown before any rotation is effected about the BC axis. Instead of rotating the mirror facet 25 about the BC axis it may be more convenient to visualize that the vehicle is rotated around the axis BC while the plane of the mirror facet 25 is held perpendicular to the paper. In this connection it is useful to refer to a real space and a virtual space. The real space is the actual space which is rotated around the BC axis. As seen in the side view of FIG. 5B the real space is rotated clockwise through the angle $\theta$ thus rotating the eye from E to $E_1$ about the pivot point BC as shown in FIG. 5B. The virtual space is the mirror image of the real space that exists for any given position of the real space.

Prior to the rotation through the angle $\theta$ the virtual eye E' is located in its virtual space position on the normal 49 to the mirror 25 at a distance from the mirror 25 equal to the distance of E to the mirror along line 49 in the real space. Similarly, the points defined by the ends of the axis BC are located in the virtual space in B', C'. It is clear that since the axis BC does not translate during a $\theta$ rotation of the real space, neither does the virtual axis B'C' so translate. Further, when the rotation occurs clockwise looking along the BC axis from C to B, $\theta$ rotation of the virtual space also occurs in a clockwise direction when looking along the axis B'C' from B' to C'.

The purpose of the following analysis is to determine the angle $\theta$ which is required so that a ray from the virtual eye $E'_1$ directed through the axis point BC as seen in FIG. 5B will make an angle $\mu$ downward into the real space as also shown in FIG. 5B. This angle may be directed at the horizontal axis of the rear view window. From an analysis of FIGS. 5A and 5B the following equation is obtained:

$$\theta - \mu = [y - (y + x \sin\theta - y \cos\theta)]/[N + \cos 2\Omega\,(x \cos\theta - x + y \sin\theta)]$$

(2)

Since the angle $\theta$ is small, the following approximations may be made:

$$\sin\theta \approx \theta$$

(3)

$$\cos\theta \approx 1$$

(4)

Accordingly, Formula (2) may be simplified as follows:

$$\theta - \mu = (y - x\,\theta)/(N + y\,\theta\,\cos 2\Omega)$$

(5)

which may be transformed as follows:

$$(y \cos 2\Omega)\,\theta^2 + (x + N - \mu y \cos 2\Omega)\,\theta - (N\mu + y) = 0$$

(6)

In the above equations N is defined as follows:

$$N = z \sin 2\Omega + x \cos 2\Omega$$

(7)

Since, as stated before, $\theta$ in general is quite small, a simplified solution is given as follows:

$$\theta = (\mu N + y - y\,\theta^2 \cos 2\Omega)/(x + N - \mu y \cos 2\Omega)$$

(8)

In order to obtain the angle $\theta$ it is first assumed that the term $y\,\theta^2 \cos 2\Omega$ is negligible. With this assumption equation (8) may now be evaluated. Then the angle $\theta$ is corrected by inserting the first calculated approximate value of $\theta$ back into equation (8). Subsequently, equation (2) is solved by using the thus calculated corrected value of $\theta$ in the right-hand side of the equation.

For a typical example, the mirror system 20 may be 37'' wide with 136 facets spaced from each other 0.2725 inch. Further, $x = 17$ inches, $y = 5.53$ inches, $\Omega = 21.0°$, $\mu = 0.125$ radians and $z = -3.2 + 0.2725\ n$. It should be noted that 360° corresponds to $2\pi$ radians or $1° = 0.01745$ radians. Furthermore, $n$ is the number of the particular mirror facet counting from the left-hand side. With this assumption the following table may be calculated.

TABLE I

| n | N | θ° |
|---|------|--------|
| 0 | 10.5 | 13.92° |
| 17 | 13.6 | 13.30° |
| 34 | 16.7 | 12.72° |
| 51 | 19.8 | 12.32° |
| 68 | 22.9 | 11.92° |
| 85 | 26.0 | 11.63° |
| 102 | 29.1 | 11.28° |
| 119 | 32.2 | 11.07° |
| 136 | 35.3 | 10.83° |

On Table 1 it will be noted that the angle $\theta$ varies between 10.83° and 13.92° or 3.09°. This, of course, means that each mirror facet is twisted with respect to an adjacent facet about the axis BC.

It should be noted that variations from parallelism between adjacent mirrors may be detected by the human eye if the variation is 0.001 radians or more. Therefore, it will be noted that the differential twist per facet at the left-hand end of the mirror assembly 20 amounting to 0.0006 radians uses up a good portion of this tolerance. This effect, of course, may be reduced by increasing the number of facets. In general, however, it may be said that the ratio of the length to the breadth of each facet may be approximately 12 to 1 or 3 inches to 0.25 inch.

Depending on the driver's closeness to the mirror system 20, the total length of the mirror assembly 20 and its particular design, the angle of the rear view will vary. In general, however, the angle has been found to vary between approximately 93° and approximately 103°.

The example on which the Table 1 is based was derived to provide a view for the driver directly rearward along the center line of the vehicle from the center of the mirror assembly 20. However, an alternate design provides a wider rear-view angle and equal angular fields of view out of the left and right-hand edges of the mirror assembly. For such a mirror design the following parameters may be assumed. Length of the mirror assembly 50 inches, $x = 17.0$ inches, $y = 6.83$ inches, $\Omega = 9.35°$, $\mu = 0.0637$ radians, $z = 9.70$ inches $+ (0.2534)\ n$, where $n$ varies from zero to 197 (197 mirror facets). With this assumption the following table may be obtained.

TABLE II

| n | N | θ° |
|---|-------|-------|
| 0 | 12.99 | 10.83 |
| 24 | 14.94 | 10.03 |
| 48 | 16.89 | 9.28 |
| 72 | 18.84 | 8.65 |
| 98.5 | 21.00 | 7.96 |
| 125 | 23.15 | 7.39 |
| 149 | 25.10 | 6.93 |
| 173 | 27.05 | 6.47 |
| 197 | 29.00 | 6.07 |

In this case the variation of the angle $\theta$ from the left-hand to the right-hand edges of the mirror assembly is 4.76° as compared to the previous value of 3.09°. This increased twist cannot be traced to any particular parameter change. Rather it is the accumulated effect of all the changes such as $\Omega$, $\mu$, $y$ and the overall length of the mirror assembly. (For shorter mirror systems the angle may be as small as 2°.) The change in the angle $\Omega$ is the result of the requirement that the right and left-hand views should have equal angles. This has been previously discussed. The changes in $\mu$ and $y$ are the result of utilizing for the purposes of this example the upper limit of the field of view determined by the windshield. This is combined with the effect of tilting of the mirror about the horizontal axis through the top of the mirror instead of about a horizontal axis at the middle of the vertical mirror dimension. The central ray in the side view such as shown in FIG. 5B is directed through the center of the vertical dimension of the rear window of the car. In the present example a ray at the top edge of the mirror is traced through the top edge of a larger rear-view window. Such an enlarged rear-view window corresponds to recent U.S. Government tentative specifications.

Figure 3:
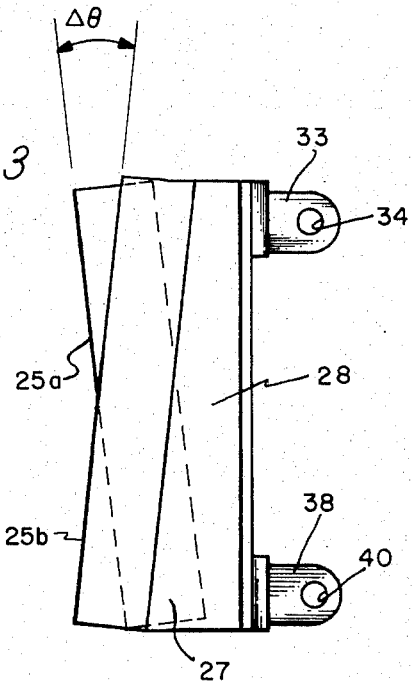
FIG. 3 is an enlarged elevational view of the mirror system of FIG. 1 illustrating the twist of the mirror facets.

The embodiment of the invention illustrated in FIGS. 1 through 3 features a front surface mirror. As explained therein the front surface 26 of each mirror facet 25 may be provided with a reflective coating. This may, for example, consist of an aluminum coating and a transparent protective coating of a suitable dielectric such, for example, as silicon oxide. Nevertheless, the front surface mirror may be damaged accidentally. Accordingly, in accordance with the present invention it is feasible to provide a rear surface mirror, that is a mirror which is coated with a reflective layer on the back surface. This, of course, will afford much better protection for the reflective coating of the mirror.

Such a mirror system is illustrated in FIG. 7. The mirror consists of a transparent material 60 having a plane front surface 61 and rear surfaces 62 disposed at an angle to a vertical plane as shown in FIG. 7. The rear surfaces 62 are provided with a reflective coating which may again consist of aluminum. The front surface 61 may be provided with a suitable anti-reflection coating such as a layer of dielectric material. The transparent material 60 may again consist of polystyrene or polymethyl methacrylate. A ray 63 entering the mirror system of FIG. 7 at a normal to the front surface 61 is reflected by the rear surface 62 as shown at 64. It then emerges into the air as a light ray 65 which makes an angle of $2\Omega$ with the incoming ray 63. If the index of refraction of the material 61 is $n_1$ it can be shown that the angle which each of the surfaces 62 must make with the front surface 61 is $\Omega/n_1$.

Another mirror system in accordance with the present invention which features correction for chromatic aberration is shown in FIG. 8. Furthermore, the mirror system of FIG. 8 is also a rear-surface mirror. The mirror system consists of a transparent body 66 having a plane rear surface 67 which is provided with a reflective coating. The material 66 is provided with flat, tilted surfaces 68 to effectively provide individual mirror facets of the type shown in FIG. 2. The chromatic aberration is corrected or compensated by an additional layer of material 70 which is provided with inclined front surfaces 71. The two materials 66 and 70 are selected to have different indices of refraction. For example, the two materials of bodies 66 and 70 may consist respectively of a suitable acrylic such as polymethyl methacrylate and polystyrene. Thus, assuming that $n_1$ and $n_2$ are respectively the indices of refraction of the materials of bodies 66 and 70 for the sodium $D_1$ line and that $u_1$ and $u_2$ are respectively their dispersion, the following formula may be derived.

$$F_2/F_1 = (n_1 - 1) u_2/(n_2 - 1) u_1 \tag{9}$$

In this formula $F_1$ is the angle shown in FIG. 8, that is the angle between a surface 68 and the surface 67 while the angle $F_2$ is the angle between the surface 71 and the surface 68.

The mirror system shown in FIG. 8 may be considered to be an achromatic combination or lens system having an effective index of refraction $n_e$. With this assumption the following formula may be derived.

$$n_e = \frac{(n_1 - 1)\left(1 - \frac{u_1}{u_2}\right)}{1 - \frac{F_2}{F_1}} + 1 \tag{10}$$

This may be reduced to the following formula (11) which gives the value of $\Omega$ which is one half of the desired angle which an incoming ray 72 makes with an outgoing ray 73 in FIG. 8.

$$F_1 - F_2 = \Omega/n_e - 1 \tag{11}$$

By selecting the angles $F_1$ and $F_2$ in accordance with equations (9) through (11), the preliminary achromatic design is achieved. These angles can be further corrected or refined by ray tracing.

The mirror system of FIG. 8 which has been corrected for chromatic aberration is particularly useful for that portion of the mirror assembly which extends to the left of a normal from the operator's eye to the mirror facets 25. It will, of course, be understood that it is also feasible to extend the mirror system of FIG. 8 across the entire width of the windshield 21.

It is also feasible to provide a day and night mirror system in accordance with the present invention. A simple way to reduce the glare of headlights of cars approaching from the rear during nighttimes is as follows.

The reflectance of a portion of the mirror system 20 may be reduced by applying an absorbable layer to the reflection coating of the mirror. Alternatively, the reflectance may be directly reduced in some manner so that the reflectance is on the order of 50 percent. This need only be done in that region of the mirror system from which the headlights of a following car directly behind the driver are reflected into the driver's eye. This means that a length of approximately 16 inches of the mirror system may be made with a reduced reflectance by overcoating with a dielectric absorbing layer or the like.

However, it is also feasible to provide a separate night-vision mirror system which may be tilted down over the daytime mirror system to reduce annoying reflection at nighttime from the high beams of following cars. Such a system is illustrated in FIG. 9.

As shown in FIG. 9, there may be provided the mirror system 20, previously disclosed, having a plurality of mirror facets 25. A second mirror system 75 may be rotatably or swingably mounted over the mirror system, for example, by a piano hinge 76. The nighttime mirror system 75 consists essentially of a relatively thin transparent shield 79 which has reduced light transmission. In other words, the material of the shield 79 may be made to absorb a predetermined portion of the light. The physical structure of the nighttime mirror system 75 consists of individual facets 77 having the same angle as the facets 25 and of substantially uniform thickness to minimize distortion. During daytime the mirror system 75 is tilted up as shown and out of the driver's field of view which for night driving is tilted down over the mirror 25.

Instead of making the nightime mirror system 75 of a light-absorbing material it can also be made of an opaque material having a front surface mirror effect by making the front surfaces 78 of a material providing reduced reflection of light. In that case, the only image seen by the driver is that reflected from the top surfaces 78.

As explained previously, it may not be necessary to provide the nighttime mirror system 75 over the entire length of the mirror system 20. It may be sufficient to extend the nighttime mirror system 75 only over that portion of the mirror system 20 which reflects the glare of the headlights of immediately following vehicles.

Another mirror system in accordance with the present invention is shown in FIG. 10. Here the day mirror system 20 with its mirror facets 25 may be tilted slightly backwards for night driving by means of the piano hinge 76 while the nighttime mirror system 75 remains in a vertical position as shown in FIG. 10. This means that the image reflected from the front surfaces of the mirror facets 25 is now reflected downward and away from the eyes of the driver. For day driving, day mirror system 20 and nighttime mirror system 75 are disposed adjacent to each other and substantially vertical. The mirror system 75 may simply consist of a transparent shield having specular front surfaces 80 which reflect the light from headlights at nighttime into the eyes of the observer but with a much reduced reflectivity. It will be understood that the nighttime mirror system 75 has the same contour as that of the mirror facets 25 and consists essentially of a thin transparent shield with a substantially uniform thicknes.

Still another embodiment of a day-night mirror system is illustrated in FIG. 11. FIG. 11 features two separate mirror systems 20 and 82. The mirror system 20 with the mirror facets 25 may be identical to that described before. The mirror system 82 having similar facets may be provided with a reduced reflectance or with a light-absorbing layer so as to minimize the glare caused by approaching cars. The day-night mirror system 20, 82 may be rotatably mounted on pivots 83 by means of its supporting body 84. The pivot 83 may be mounted in a disk 85 interconnected by a member 86 to a plate 87 which may be secured by cementing or the like to the windshield 21 of a car in the manner previously explained. Accordingly, for nighttime driving the entire mirror system is rotated through 180° so that nighttime mirror system 82 is in an operating position.

As explained before, the mirror structure of the invention features a longitudinal twist that is defined by the angle Δθ. This may be introduced into the mirror structure in various ways. For example, the support structure 28 (FIG. 3) may be a stamped metal or molded plastic part, incorporating the required twist. Subsequently the mirror facets 25 may be secured to the twisted support plate by cementing or the like.

Alternatively, the longitudinal twist may be provided by simply molding the mirror facets initially in such a way that the entire structure is molded with the required twist.

If the facet width is large, each facet surface will thus incorporate a twist. If the facets are small enough the twist within each facet is not necessary.

In order to describe a single twisted mirror facet reference is made to FIG. 3. It has previously been explained that FIG. 3 illustrates the extreme left-hand facet 25a and the extreme right-hand facet 25b. For the present it will be assumed that 25b shows the front portion of a single facet twisted in a counter-clockwise direction, that is in the direction of a left-hand screw. According, 25a illustrates the rear portion of the same facet so that the upper triangular portion visible in FIG. 3 illustrates that portion of the reflective mirror facet surface shown in the view of FIG. 3.

It can be shown that the angle of twist required for the mirror system of the invention depends on the position of the driver. In other words it depends on his distance from the mirror and on the driver's height, that is, on y. In particular, the difference of the twist angle between the left-most and the right-most mirror facet 25 depends on y as does the average angle of twist, that is the angle of the middle facet. Accordingly, it would be desirable to provide means for changing the angle of twist as the mirror is tilted in accordance with the distance of the driver from the mirror and his height. An embodiment of the invention which accomplishes this is shown in FIGS. 12 and 13 to which reference is now made. As shown here the mirror system 20 is provided with a left-hand adjustment device 100 and it will be understood that the same adjustment device is provided on the right-hand side of the system, not illustrated.

The mirror system is again pivoted as previously described. Accordingly, a tongue 38 is secured to the mirror system 20 which is inserted into the U-shaped structure 35 having a rear plate 36 secured to the windshield 21. The tongue 38 is pivoted to the U-shaped structure 35 by the bolt 37.

The adjustment device 100 includes a screw 101 having an external screw thread as shown. The screw 101 is disposed in a metal sleeve 102 which is internally threaded and provided with an opening 103 through which a bolt 104 may extend. A tongue 105 integral with the plate 106 is extended into an opening of the sleeve 102 and pivots about the bolt 104. The plate 106 is secured to the windshield 21.

The threaded screw 101 is driven or rotated by a worm gear 110 in engagement therewith. The worm gear 110 is rotatably disposed in a casing 111 through which extends a shaft 112 bearing a knurled knob 114 at the left-hand end. A portion of the shaft 112 is threaded as shown at 115 and in turn engages the worm gear 110. The screw 101 is rotatably mounted in a ball and socket joint 116 which in turn is secured to the mirror system 20.

It will now be apparent how the adjustment device 100 operates. Upon rotation of the shaft 112 by actuating the knurled knob 114, the worm gear 110 is rotated which in turn will either advance or retract the screw 101 into or out of its casing 102. This, of course, will tilt the mirror system 20 about its pivot axis defined by the bolt 37.

The pitch of the corresponding screw 101 of the right-hand adjustment device, which is also operated by the shaft 112, is different from that of the left-hand device. This, in turn, means that as the mirror system is tilted or rotated about its pivot axis the angle of twist is increased or decreased by the left and right-hand adjustment devices. It can also be shown that the variation of the angle of twist between the left-most and right-most mirror facets is linear as the mirror system is tilted downwards or upwards. This arrangement makes it possible to adjust the twist of the mirror system for any size of driver and the adjustment may be changed for a different driver. It will be understood that the left-hand adjustment device 100 must have such screw threads that it moves faster than the corresponding right-hand adjustment device. This means that the angle of twist is increased as the mirror system is tilted downwards.

Reference is now made to the modified mirror system of FIGS. 14, 15, and 16. This illustrates again the mirror system 20 as previously disclosed having individual mirror facets 25. The mirror facets 25 are preferably provided with a front reflective coating 26. The mirror facets 25 may be secured to a support structure 28. So far the mirror system is the same as that described in connection with FIGS. 1 – 3.

In accordance with the embodiment of FIGS. 14 to 16, there is now provided a transparent cover 120 which may consist of any transparent material such as glass or a plastic material. The transparent cover 120 extends downwardly at an acute angle as clearly shown in FIG. 15 to minimize ghost images. To this end the front surface of the cover 120 may be provided with an antireflective coating 121. Similarly, the rear surface facing the mirror system 20 is preferably also provided with an antireflective coating 122.

Furthermore, the entire mirror system may be enclosed in a box formed by a top wall 124, a bottom wall 125 and side walls 126, to provide a dust proof enclosure for the mirror system. The transparent cover 120 thus protects the mirror system 20 so that it will not collect dust or smudge marks and so that it will not require cleaning. Furthermore, the top, bottom and side walls 124, 125 and 126 provide a strong, boxlike structure to protect the mirror mechanically and resist bending or twisting thereof. This construction also provides sufficient structural rigidity as to minimize vibration of the mirror which would affect the quality of the image.

As shown in FIG. 15 an entering ray 128 may be reflected from the outer surface of the cover 120 as shown at 130. Furthermore, the same ray 128 will also be reflected at 131 from the rear surface of the cover 120 to provide another reflection shown in dotted lines at 132. Both of the rays 130 and 132 will be seen by the eye of the observer shown at 133.

Additionally, there may be two more ghost images, as shown in FIG. 16. A ray 135 is transmitted through cover 120 to reflective surface 26, and thence reflected through the transparent cover 120 as ray 136. A portion of the energy in ray 136 is reflected from the two surfaces of cover 120, as rays 137 and 138; which, in turn are reflected from surface 26 into the eye of the driver, 133. Accordingly, there may be a total of four ghost images, two reflected by the two surfaces of the cover 120 and two more created by the reflection of a ray from the mirror facets 25 and then by the two surfaces of the cover 120.

As shown particularly in FIG. 15, the effect of the ghost images from a ray such as 128 may be minimized by tilting the cover 120 upwardly with respect to the mirror facets 25 as shown in FIG. 15 so that the ghost images are reflections of the roof of the vehicle which is normally not brightly illuminated. Additionally, the antireflective coating 122 may be required, as shown by experience, to reduce ghost images which may be created by the reflection of light rays such as 135 at the mirror facets. There is no convenient way to tilt cover 120 to diminish the brightness of rays 139 and 140, since ray 138 originates generally from objects in the desired field of view. Optionally, the antireflective coating 121 may be added to further reduce the intensity of the ghost images. The antireflective coatings are also effective in reducing the intensity of rays 130 and 132, which become troublesome at that part of mirror 20 most remote from the driver, where the rays 128 emanate from the sky, and not the vehicle roof.

There has thus been disclosed a wide-angle rear-view mirror system for an automotive vehicle. The mirror system is characterized by its simplicity and its ease of manufacture. It consists of individual mirror facets set at an angle with respect to a vertical plane and provided with a longitudinal twist. As a result the rear-view afforded by such a mirror system may exceed 90° and permits a substantially undistorted view of vehicles approaching the driver not only in his own lane, but in adjacent lanes. The field of view is sufficiently large that vehicles passing immediately to the left or right are seen by direct observation in the driver's peripheral vision before the images of the passing vehicles leave the mirror field of view. It can be designed to minimize accidental mirror impact hazards to the vehicle occupants. Various combination day and nighttime mirror systems have been disclosed to minimize the glare which may be caused by the headlights of an approaching car.

What is claimed is:

1. A wide-angle rear-view mirror system for an automotive vehicle comprising:
   a. an elongated support structure; and
   b. a multiplicity of individual mirror facets mounted adjacent to each other on said support structure, said mirror facets being tilted with respect to a vertical plane extending across the vehicle and passing through said support structure and said facets being disposed approximately parallel to each other, and said mirror facets being twisted about a horizontal axis passing through said support structure, thereby to afford a wide rear view substantially without distorting the size or the relative speed of other vehicles approaching from the rear.

2. A rear view mirror system as defined in claim 1 wherein each of said mirror facets forms substantially the same angle with said vertical plane which is so dimensioned that the rear view afforded by the left-hand portion of said mirror system equals that afforded by the right-hand portion thereof.

3. A rear view mirror system as defined in claim 2 wherein said angle equals $\gamma - \beta/4$ where $\gamma$ is the angle between a normal to said vertical plane and a ray from the observer's eye to the most right-hand mirror facet, and where $\beta$ is the angle between said normal and a ray from the observer's eye to the left most one of said mirror facets.

4. A rear-view mirror system as defined in claim 1 wherein the front surface of each of said mirror facets facing the driver is provided with a reflective coating.

5. A mirror system as defined in claim 4 wherein said reflective coating is protected by a transparent coating.

6. A mirror system as defined in claim 1 wherein said mirror facets consist of a transparent material and are provided with a substantially plane front surface facing a driver and wherein the opposed rear surfaces are tilted with respect to said vertical plane.

7. A mirror system as defined in claim 6 wherein said front surface is provided with an antireflective coating.

8. A mirror system as defined in claim 1 wherein a common rear surface of said mirror facets is substantially plane and provided with a reflective coating and wherein said mirror facets consist of a transparent material.

9. A mirror system as defined in claim 8 wherein said mirror facets are formed by two transparent materials, each having a different index of refraction and dispersion and wherein one of said materials forms a first angle with said vertical plane and the other one of said materials forms a second shallower angle with said vertical plane, said indices of refraction, said dispersions and said angles being so selected that an entering ray is reflected by said rear surface and emerges again at a predetermined desired angle, whereby chromatic aberration may be minimized.

10. A mirror system as defined in claim 1 wherein means are provided for reducing the reflectance of that portion of said mirror system reflecting objects within the driver's lane.

11. A mirror system as defined in claim 10 wherein said means includes an absorbant shield having an antireflective front coating and means for rotatably supporting said shield over said mirror system for selectively reducing the light intensity within said portion of said mirror system.

12. A mirror system as defined in claim 1 wherein a night vision mirror system is additionally provided, and means for rotatably supporting said night vision system over said rear-view mirror system, said night vision mirror system consisting of a thin transparent shield of substantially uniform thickness and having an outline conforming to that of said mirror facets.

13. A mirror system as defined in claim 12 wherein said shield is provided with a partially reflective coating to reflect a portion of the incoming light.

14. A mirror system as defined in claim 1 wherein an additional night vision mirror system is provided, and means for rotatably mounting said rear-view mirror system on said night vision mirror system to permit tilting in the rearward direction of said rear-view mirror system, said night vision mirror system consisting of individual facets substantially parallel to said mirror facets of said rear-view mirror system, said night vision mirror system providing reflectance of a portion of the incoming light.

15. A rear-view system as defined in claim 1 and further including a night vision mirror system substantially identical to said rear-view system but providing a reduced reflectance, said two mirror systems being mounted back to back, and means for rotatably mounting said two mirror structures in an automotive vehicle so that either one may be rotated into an operative position.

16. A rear-view mirror system as defined in claim 1 wherein each mirror facet has a length which is large compared to its width.

17. A rear-view mirror system as defined in claim 1 wherein said mirror facets are twisted about said horizontal axis by an angle on the order of 2° to 5°.

18. A rear-view mirror system as defined in claim 1 wherein each of said mirror facets forms an angle with said vertical plane on the order of 9° to 21°.

19. A rear-view system as defined in claim 1 wherein a cover of transparent material is provided in front of said rear-view mirror system and facing the driver, said cover forming an acute angle with the top of said rear-view mirror system to minimize ghost images.

20. A rear-view mirror system as defined in claim 19 wherein an antireflective coating is provided on the inner surface of said cover.

21. A rear-view mirror system as defined in claim 19 wherein an antireflective coating is provided on the outside surface of said cover.

22. A wide-angle rear-view mirror system for an automotive vehicle comprising:
   a. an elongated support structure capable of being twisted;
   b. a multiplicity of individual mirror facets mounted adjacent to each other on said support structure, said mirror facets being tilted with respect to a vertical plane extending across the vehicle and passing through said support structure, said facets being disposed approximately parallel to each other and being twisted about a horizontal axis passing through said structure; and
   c. means cooperating with said support structure for relatively twisting one end portion of said support structure with respect to the other, thereby to adjust the angle of twist to accommodate drivers of different height and at different distances from said mirror facets.

23. A wide-angle rear-view mirror system for an automotive vehicle comprising:
   a. an elongated support structure; and
   b. a multiplicity of individual mirror facets mounted adjacent to each other on said support structure, said mirror facets being tilted with respect to a vertical plane extending across the vehicle and passing through said support structure, adjacent portions of adjoining facets being disposed parallel to each other to provide an uninterrupted rear view and said mirror facets being twisted about a horizontal axis passing through said support structure, thereby to afford a wide rear view substantially without distorting the size or the relative speed of other vehicles approaching from the rear.

24. A rear-view mirror system as defined in claim 23 wherein each of said facets extends along a flat untwisted plane and has a length along said horizontal axis small enough that said adjacent portions of adjoining facets are parallel to each other.

25. A rear-view mirror system as defined in claim 23 wherein each of said facets has a length along said horizontal axis which is so large that in order to cause said adjacent portions of adjoining facets to be parallel, each of said facets is twisted along its entire length.

\* \* \* \* \*

UNITED STATES PATENT OFFICE
CERTIFICATE OF CORRECTION

Patent No. 3,806,233     Dated   May 17, 1974

Inventor(s)   Nicholas M. Stefano

It is certified that error appears in the above-identified patent and that said Letters Patent are hereby corrected as shown below:

In the title "MULTIFACE" should be deleted and --MULTIFACET-- substituted therefor.

Page 7, line 57 "The" should be deleted and --One of the-- substituted therefor.

Signed and sealed this 29th day of October 1974

(SEAL)
Attest:

McCOY M. GIBSON JR.
Attesting Officer

C. MARSHALL DANN
Commissioner of Patents